United States Patent Office 3,501,488
Patented Mar. 17, 1970

3,501,488
PRODUCTION OF THIAZOLES BY DEHYDROGENATION AND CYCLISATION OF A NITROGENOUS ORGANIC COMPOUND WITH SULPHUR
Neville Colebourne, Runcorn, England, assignor to Imperial Chemical Industries Limited, London, England, a corporation of Great Britain
No Drawing. Continuation-in-part of application Ser. No. 545,524, Apr. 21, 1966. This application July 22, 1966, Ser. No. 567,090
Claims priority, application Great Britain, May 7, 1965, 19,402/65; Aug. 26, 1965, 36,684/65
Int. Cl. C07d *91/30*
U.S. Cl. 260—302                          4 Claims

ABSTRACT OF THE DISCLOSURE

There is provided a process for the production of thiazoles by heating together in the gas phase sulphur and a secondary amine or imine at temperatures, preferably in the range of 400° C. to 700° C.

---

This is a continuation-in-part of U.S. patent application Ser. No. 545,524, filed on Apr. 21, 1966, and entitled Chemical Process.

This invention relates to the production of thiazole and substituted derivatives thereof, for example alkyl thiazoles.

It has been suggested to dehydrogenate hydrocarbons by heating with sulphur resulting in the production of unsaturated hydrocarbons and in some cases in the production of thiophenes. We have discovered that nitrogenous compounds of suitable composition and structure may be dehydrogenated with sulphur to produce thiazoles.

Accordingly the present invention provides a gas phase process for the production of thiazole or substituted derivatives thereof comprising heating sulphur with a nitrogenous organic compound containing an appropriate number and arrangement of carbon, nitrogen and hydrogen atoms whereby the nitrogenous organic compound is dehydrogenated and cyclised with the incorporation of sulphur into the ring to form thiazole or a substituted derivative thereof. The product will depend upon the nitrogenous organic compound which is used as a starting material and by appropriate choice of nitrogenous organic compound it will be possible for one skilled in the art to produce thiazole itself or a substituted derivative thereof.

For example it is clearly necessary for the nitrogenous organic compound to possess at least one nitrogen atom and three carbon atoms (but bearing in mind the possibility of in situ formation). Furthermore it is necessary for the nitrogenous organic compound to have sufficient hydrogen atoms to permit cyclisation, the incorporation of sulphur into the ring and the formation of unsaturated bonds in the thiazole. The nitrogenous organic compound may of course itself be partially unsaturated. Preferably the nitrogen atom in the nitrogenous organic compound is directly linked to two and no more than two carbon atoms.

For example the starting material may be a secondary amine of general formula

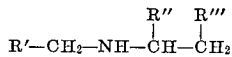

or an imine of general formula

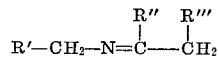

where R', R", and R''' are substituents which do not interfere with the reaction including hydrogen and hydrocarbon groups or derivatives thereof, and the thiazole obtained is of the general formula

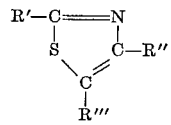

In some cases one or more of the groups R', R" and R''' may be modified or eliminated during the reaction.

In the simplest case R', R" and R''' all represent hydrogen (e.g., in methylethylamine) and thiazole itself is produced whereas with diethylamine R' equals $CH_3$, R" and R''' are hydrogen and the thiazole obtained is 2-methylthiazole. The nitrogenous organic compound may be formed in situ from simpler precursors, e.g., an imine may be formed from a primary amine and an aldehyde.

The process should preferably be carried out between 200° C. and 1000° C. and preferably between 250° C. and 750° C. Below 250° C. the dehydrogenation proceeds slowly whereas above 750° C. there is a tendency for other products to be formed in preference to thiazoles.

Short reaction times (i.e., of the order of less than 1 sec.) tend to produce low yields of thiazole.

Preferably the reaction is carried out in an inert atmosphere.

The process is conveniently carried out by entraining the starting material and the sulphur in nitrogen at a suitable temperature and passing the entrained reactants in the gaseous phase into the reaction zone.

Pressure is not critical but superatmospheric pressure may be advantageous in some cases.

Stoichiometric proportions of sulphur and starting material are conveniently used allowing for dehydrogenation and incorporation of sulphur into the thiazole in appropriate cases.

Although it was not necessary to isolate the products for purposes of analysis the thiazoles produced in the examples below could easily be isolated by conventional means, e.g., distillation.

Examples of the invention will now be described.

EXAMPLE 1

Sulphur and diethylamine were separately entrained in nitrogen by blowing the nitrogen through them at 325° C. and 0° C. respectively. The 2 gas streams were mixed in a 500 ml. cylindrical Pyrex glass reactor (nitrogen flushed to remove air) at 500° C. The exit gases were passed through two traps at 100° C. to remove the excess sulphur and tar-like materials. Products condensable at −78° C. were then removed from the gas stream. During a period of 45 mins. 48 mls., of diethylamine were reacted and 13.9 gms. of material condensed at −78° C. Distillation of 4.22 gms. of the latter yielded 2.22 gms. of a product B.P. 129° C. which was 2-methylthiazole identified as follows. The mass spectrum of this compound gave a molecular ion at mass 99 and an isotopic ratio which indicated the presence of one sulphur atom per molecule. Elemental analysis showed the composition to be C, 46.73%, H, 5.07%, N, 13.96% and S, 34.24% corresponding to the empirical formula $C_4H_5NS$. The infra-red spectrum of the compound was identical to the standard spectrum for 2-methylthiazole (Can. J. Chem., 35, 423 (1957)).

EXAMPLE 2

Sulphur and diethylamine were separately entrained in nitrogen by blowing the nitrogen through them at 325° C. and 0° C. respectively. The 2 gas streams were mixed in a 500 ml. cylindrical Pyrex glass reactor (nitrogen flushed to remove air) at 500° C. The exit gases were passed through two traps at 100° C. to remove the excess sulphur and tar-like materials. Some of the products condensable at −78° C. were then removed from the gas stream by means of a trap. During a period of 1 hr. 29.8 gms. of diethylamine were reacted and the reacted material passed through the cold trap at −78° C. Analysis, by gas chromatography, of the condensed material and gas stream yielded 11.1 gms. of 2-methylthiazole.

EXAMPLE 3

Sulphur and ethylidene-ethylamine were separately entrained in nitrogen by blowing the nitrogen through them at 325° C. and −8° C., respectively. Otherwise the experimental conditions were as given in Example 2. During a period of 25 mins., 7.9 gms. of ethylidene-ethylamine were reacted. Gas chromatographic analysis of the condensed material and gas stream yielded 4.5 gms. of 2-methylthiazole.

EXAMPLE 4

Sulphur, acetaldehyde and ethylamine were separately entrained in nitrogen by blowing the nitrogen through them at 325° C., −20° C. and −20° C., respectively. The acetaldehyde and ethylamine streams were mixed before they entered the reactor. The apparatus was arranged as in Example 2. In 15 mins., acetaldehyde and ethylamine equivalent to 15.43 gms. of ethylidene-ethylamine were reacted. Gas chromatographic analysis of the condensed material and gas stream yielded 1.3 gms. of 2-methylthiazole.

EXAMPLE 5

Sulphur and ethylidene-methylamine were separately entrained in nitrogen by blowing nitrogen through them at 325° C. and −20° C., respectively. The experimental conditions were as described in Example 2. Over a period of 83 mins., 19.2 gms. of ethylidene-methylamine were reacted. Gas chromatographic analysis of the condensed material and gas stream yielded 5.48 gms. of thiazole. A sample of the latter was isolated by distillation of the condensed products and its structure verified by the techniques described in Example 1.

EXAMPLE 6

Sulphur and acetaldehyde were separately entrained in nitrogen by blowing nitrogen through them at 325° C. and −20° C., respectively. Methylamine vapour was metered into the acetaldehyde stream before the latter entered the reactor. Otherwise the apparatus and conditions were as described in Example 2. Over a period of one hour, acetaldehyde and methylamine equivalent to 56.0 gms. of ethylidene-methylamine were reacted. Gas chromatographic analysis of the condensed products and gas stream yielded 5.4 gms. of thiazole.

EXAMPLES 7–12

A series of experiments was performed using conditions similar to those in Example 1 except that the reactor temperature was varied and longer times were employed. The results are listed in Table I which gives yields of 2 methylthiazole in gms. on approximately 142 gms. of diethylamine starting material.

TABLE I

| Ex. No. | Temp., ° C. | 2-methylthiazole, gms. | Time, hrs. |
|---|---|---|---|
| 7 | 300 | <1 | 4 |
| 8 | 400 | <4 | 4 |
| 9 | 500 | 32.5 | 4¾ |
| 10 | 700 | 1.8 | 4¼ |
| 11 | 800 | <1 | 3 |
| 12 | 900 | <1 | 3 |

Yields of thiazoles and nitriles obtained for different reactant amides and imides are given in the following Tables II and III. Reaction conditions for amines and imines not otherwise exemplified were the same as those given in the foregoing examples with the exception that entrainment temperatures were adjusted as required to ensure the supply of stoichiometric quantities of sulphur and reactant amine or imine to the reaction zone.

TABLE II
[Percentages are wt./wt. on reactant consume]

| Reactant | Products (percent) | | | | |
|---|---|---|---|---|---|
| | $CH_3CN$ | $C_2H_5CN$ | $C_3H_7CN$ | 2-methyl-thiazole | Thiazoles |
| Diethylamine | 7.1 | | | 37.2 | |
| Triethylamine | 0.3 | | | 2.0 | |
| Di-n-propylamine | | N.D. | | | 8.3 |
| Di-n-butylamine | | | 15.6 | | 3.9 |

TABLE III
[Percentages are wt./wt. on reactant consumed]

| Reactant | Product (percent) | | | | | |
|---|---|---|---|---|---|---|
| | $CH_3CN$ | $C_2H_5CN$ | Thiazole | 2-methyl | 4-methyl | 5-methyl |
| Ethylidene-methylamine | 23.5 | | 28.5 | | | |
| Ethylidene-ethylamine | 10.8 | | | 57.0 | | |
| Iso-propylidene-methylamine | 1.2 | | | | 39.5 | |
| n-Propylidene-methylamine | | 4.6 | | | | 13.4 |

What we claim is:
1. A process for the production of thiazole or a substituted derivative thereof which comprises heating together in the gas phase, sulphur and a nitrogenous organic compound selected from the group consisting of di-lower alkyl amines and N-lower alkylidene lower alkyl amines, the temperature during the said heating being between 400° C. and 750° C.

2. A process as claimed in claim 1 in which the nitrogenous organic compound is an imine formed in situ from a primary amine and an aldehyde.

3. A process a claimed in claim 1 when conducted in an inert atmosphere.

4. A process as claimed in claim 3 in which the reactants are entrained in nitrogen.

References Cited

Elderfield, Heterocyclic Compounds, vol. 5 (New York, 1957), pp. 496 and 503–504.

Hartough, The Chemistry of Heterocyclic Compounds, vol. 3 (Interscience, New York, 1952), pp. 48 and 55–60.

Wiley, "The Preparation of Thiazoles," Organic Reactions, vol. 6 (Roger Adams, ed., New York, 1951), pp. 376–377.

ALTON D. ROLLINS, Primary Examiner